(12) United States Patent
Harvey

(10) Patent No.: US 9,469,415 B1
(45) Date of Patent: Oct. 18, 2016

(54) METHOD, SYSTEM, AND APPARATUS FOR A DIFFRACTIVE BASED COHERENT AIRCRAFT POSITION AND ANTICOLLISION LIGHTING SYSTEM

(75) Inventor: Eric Joseph Harvey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 13/442,398

(22) Filed: Apr. 9, 2012

(51) Int. Cl.
*B64D 47/00* (2006.01)
*B64D 47/06* (2006.01)
*B64D 47/04* (2006.01)
*F21W 101/06* (2006.01)
*F21Y 101/02* (2006.01)

(52) U.S. Cl.
CPC .............. *B64D 47/06* (2013.01); *B64D 47/00* (2013.01); *B64D 47/04* (2013.01); *F21W 2101/06* (2013.01); *F21Y 2101/025* (2013.01)

(58) Field of Classification Search
CPC ...... G02B 6/006; G02B 6/008; B64D 47/04; B64D 47/06; B64D 47/02; F41H 13/0056; F21Y 2101/025; B64C 2027/8236; F21W 2101/06
USPC ................ 362/259, 470, 553–556, 471–472; 340/815.4, 952
See application file for complete search history.

(56) References Cited

U.S. PATENT DOCUMENTS

| | | | | |
|---|---|---|---|---|
| 4,309,746 | A * | 1/1982 | Rushworth | 362/259 |
| 5,690,408 | A * | 11/1997 | de la Pena et al. | 362/556 |
| 5,997,163 | A * | 12/1999 | Brown | 362/553 |
| 6,028,624 | A * | 2/2000 | Watkins | 348/122 |
| 6,126,299 | A * | 10/2000 | Hypes et al. | 362/259 |
| 6,169,594 | B1 * | 1/2001 | Aye et al. | 349/196 |
| 7,402,818 | B2 * | 7/2008 | Forsyth et al. | 250/492.1 |
| 2002/0101189 | A1 * | 8/2002 | Vo et al. | 315/241 S |
| 2002/0196625 | A1 * | 12/2002 | Krietzman | 362/259 |
| 2002/0196637 | A1 * | 12/2002 | Dubin et al. | 362/470 |
| 2003/0063884 | A1 * | 4/2003 | Smith | G02B 6/032 385/129 |
| 2005/0122727 | A1 * | 6/2005 | Machi et al. | 362/470 |
| 2006/0077321 | A1 * | 4/2006 | Ukawa | 349/113 |
| 2006/0257089 | A1 * | 11/2006 | Mueth et al. | 385/125 |

(Continued)

OTHER PUBLICATIONS

Guangya Zhou, Y. C., Genetic local search algorithm for optimization design of diffractive optical elements. Applied Optics, 4281 (1999).
Mait, J. N., Understanding diffractive optic design in the scalar domain, U.S. Army Reaserch Laboratory, 2145-2158 (1995).
Goodman, J.W., Introduction to Fourier Optics, Second Edition, The McGraw-Hill Companies, Inc. (1996).

(Continued)

*Primary Examiner* — Peggy Neils
*Assistant Examiner* — Zheng Song
(74) *Attorney, Agent, or Firm* — Kunzler Law Group, PC

(57) ABSTRACT

A method, system, and apparatus for a diffractive based coherent aircraft position and anti-collision lighting system may include generating optical source signals in an aircraft lighting system utilizing one or more coherent light sources. The generated optical source signals may be communicated to diffractive optical elements in the aircraft via optical waveguides, and output optical signals may be generated for transmission out of the aircraft via the diffractive optical elements. The lighting system may comprise indicator lights and/or anti-collision lights. The coherent light source may comprise a solid state laser. The diffractive optical elements may be integrated in wingtips and/or a fuselage of the aircraft. The coherent optical sources may be located within a fuselage of the aircraft and/or within wings of the aircraft. The diffractive optical elements may be statically and/or dynamically controlled and may comprise liquid crystals.

19 Claims, 11 Drawing Sheets

(56) References Cited

U.S. PATENT DOCUMENTS

| | | | |
|---|---|---|---|
| 2008/0137353 A1* | 6/2008 | Larsen et al. | 362/470 |
| 2008/0310176 A1* | 12/2008 | Hirni et al. | 362/470 |
| 2010/0046241 A1* | 2/2010 | Lundberg et al. | 362/470 |
| 2011/0018439 A1* | 1/2011 | Fabbri et al. | 315/77 |
| 2011/0122635 A1* | 5/2011 | Calvin et al. | 362/470 |
| 2011/0299274 A1* | 12/2011 | Schwarz | 362/183 |
| 2012/0069589 A1* | 3/2012 | Willeke et al. | 362/470 |
| 2013/0178917 A1* | 7/2013 | Mirkov et al. | 607/89 |

OTHER PUBLICATIONS

O'Shea et al., Diffractive Optics: Design, Fabrication, and Test, pp. 115-120, SPIE—The International Society for Optical Engineering, Bellingham, WA (2004).

McAulay, A.D., Military Laser Technology for Defense: Technology for Revolutionizing 21st Century Warfare, pp. 74-76, John Wiley & Sons, Inc. Hoboken, NJ (2011).

* cited by examiner

METHOD, SYSTEM, AND APPARATUS FOR A DIFFRACTIVE BASED COHERENT AIRCRAFT POSITION AND ANTICOLLISION LIGHTING SYSTEM

FIELD

Certain embodiments of the invention relate generally to aircraft lighting. More specifically, certain embodiments of the invention relate to a method, system, and apparatus for a diffractive based coherent aircraft position and anti-collision lighting system.

BACKGROUND

Conventional aircraft light assemblies emit both spectrally and spatially non-coherent light and thus rely on reflective and/or refractive optics to control the light's photometric characteristics. Each of these methods requires large supporting structures and transparent leading edge lenses. These methods also provide limited control of the light intensity pattern.

Furthermore, the optical assemblies for incandescent and light emitting diode (LED) systems require large leading edge lenses with wetted surface areas that can be in excess of 100 square inches. The majority of existing wingtip light lenses is made from glass for durability reasons. These glass lenses add weight to an aircraft, and present possible failure modes such as lens hazing, and cracking from impact or thermal expansion/contraction. The geometry of glass lenses are also constrained by limitations in the glass molding processes. Complex compound curves, and highly contoured lenses become increasingly difficult to implement as well as add optical losses and distortion to the intensity pattern. As wings decrease in thickness, and have more complex contours, the limitations of large glass lenses/lights can hinder the ability of making an aerodynamically optimized wingtip.

Accordingly, there is a need for systems and methods for a coherent-based position and anti-collision light system.

Further advantages of the present invention as compared to conventional and traditional approaches of aircraft luminaire design will become apparent to one of skill in the art, through comparison of such systems with the present invention as set forth in the remainder of the present application with reference to the drawings.

BRIEF SUMMARY

In one aspect, a method for aircraft lighting may include generating optical source signals in an aircraft lighting system utilizing one or more coherent light sources. The generated light source signals may be communicated to one or more diffractive optical elements in the aircraft via one or more optical waveguides, and one or more output optical signals may be generated for transmission out of the aircraft via the diffractive optical elements. The lighting system may comprise indicator lights and/or anti-collision lights. The coherent light source may comprise a solid state laser. The one or more diffractive optical elements may be integrated in wingtips and/or a fuselage of said aircraft. The one or more coherent light sources may be located within a fuselage of the aircraft and/or within one or more wings of the aircraft. The one or more diffractive optical elements may be static and/or dynamically controlled and may comprise liquid crystals.

In another aspect, a system for aircraft lighting may include an aircraft lighting system that is operable to generate optical source signals utilizing one or more coherent light sources. The generated light source signals may be communicated to one or more diffractive optical elements in the aircraft via one or more optical waveguides, and one or more output optical signals may be generated for transmission out of the aircraft via the diffractive optical elements. The lighting system may comprise indicator lights and/or anti-collision lights. The coherent light source may comprise a solid state laser. The one or more diffractive optical elements may be integrated in wingtips and/or a fuselage of said aircraft. The one or more coherent light sources may be located within a fuselage of the aircraft and/or within one or more wings of the aircraft. The one or more diffractive optical elements may be static and/or dynamically controlled and may comprise liquid crystals.

In another aspect, an apparatus for aircraft lighting may include an aircraft lighting apparatus that is operable to generate optical source signals utilizing one or more coherent light sources. The generated light source signals may be communicated to one or more diffractive optical elements in the aircraft via one or more optical waveguides, and one or more output optical signals may be generated for transmission out of the aircraft via the diffractive optical elements. The lighting apparatus may comprise indicator lights and/or anti-collision lights. The coherent light source may comprise a solid state laser. The one or more diffractive optical elements may be integrated in wingtips and/or a fuselage of said aircraft. The one or more coherent light sources may be located within a fuselage of the aircraft and/or within one or more wings of the aircraft. The one or more diffractive optical elements may be static and/or dynamically controlled and may comprise liquid crystals.

The features, functions, and advantages that have been discussed can be achieved independently in various embodiments or may be combined in yet other embodiments, further details of which can be seen with reference to the following description and drawings.

DETAILED DESCRIPTION

Figure 1:
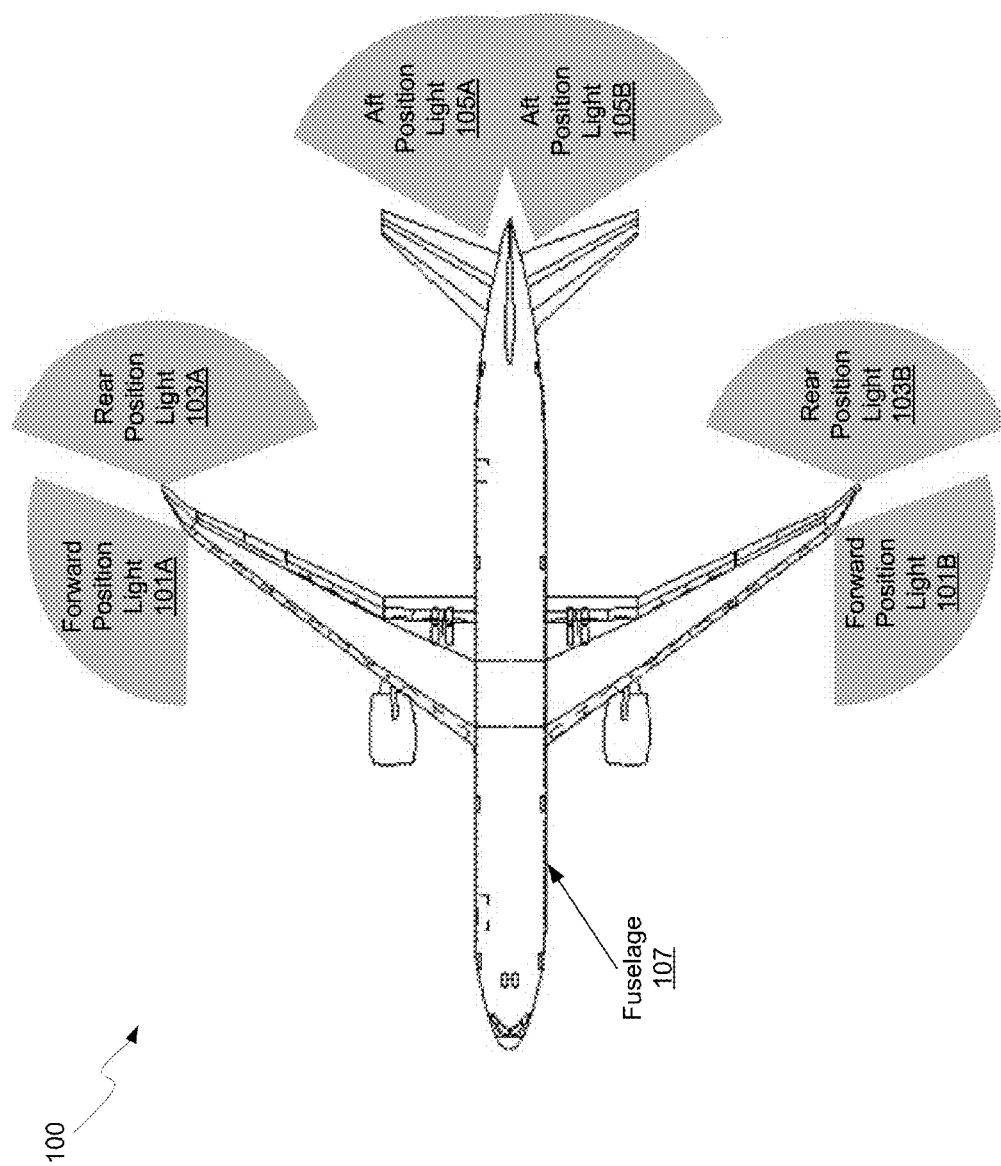
FIG. 1 is a diagram illustrating an exemplary position light system on an aircraft, in accordance with an embodiment of the invention.

FIG. 1 is a diagram illustrating an exemplary position light system on an aircraft, in accordance with an embodiment of the invention. Referring to FIG. 1, there is shown an aircraft 100 comprising forward position lights 101A and 101B, wingtip rear position lights 103A and 103B, tail cone position lights 105A and 105B, and a fuselage 107.

The wingtip forward position lights 101A and 101B in the leading edge of each wingtip comprise solid red and green lights, with the port side forward position light 101A being red and the starboard side forward position light 101B being green. The wingtip rear position lights 103A and 103B comprise solid white lights. The tail cone position lights 105A and 105B may comprise solid white lights and may be mounted in the tail cone of the fuselage 107.

In an exemplary embodiment of the invention, the forward position lights 101A and 101B, wingtip rear position lights 103A and 103B, and tail cone position lights 105A and 105B may comprise a coherent-based light system with diffractiye optical elements (DOES). Accordingly, a coherent light source may be utilized to communicate an optical signal to one or more DOE assemblies at lighting locations on the aircraft 100. The light pattern emitted by a DOE may be configurable, such that the index of refraction across the area of the DOE may be varied to generate a light pattern that complies with FAR requirements. The index variation across the DOE results in variable phase delay of optical signals passing through different regions of the DOE, resulting in a diffraction pattern.

The DOE assembly surface area may be on the order of a millimeter or less in size, drastically reducing the size of aircraft skin penetrations required for lighting purposes, as compared to conventional lighting housings. Additionally, the minimal size of the DOE greatly reduces lens assembly size, as the lens may be utilized more for protection of the ~1 square millimeter DOE than for configuring the emitted beam pattern of a bulb assembly, as in conventional lights.

Furthermore, the coherent light source may be installed remotely from the DOE, due to minimal loss in fiber optic transmission. Accordingly, the laser source may be located in a less restricted volume within the fuselage, for example, thereby reducing the use of limited volume in the wings. Reducing extraneous equipment in the wings allows for greater flexibility in wing design as wing dimensions decrease. Locating the coherent source remotely has the added benefit of improving the ease of maintenance, since the light source may be located at an easily accessible location, even allowing for in-flight replacement, if necessary.

Figure 2A:
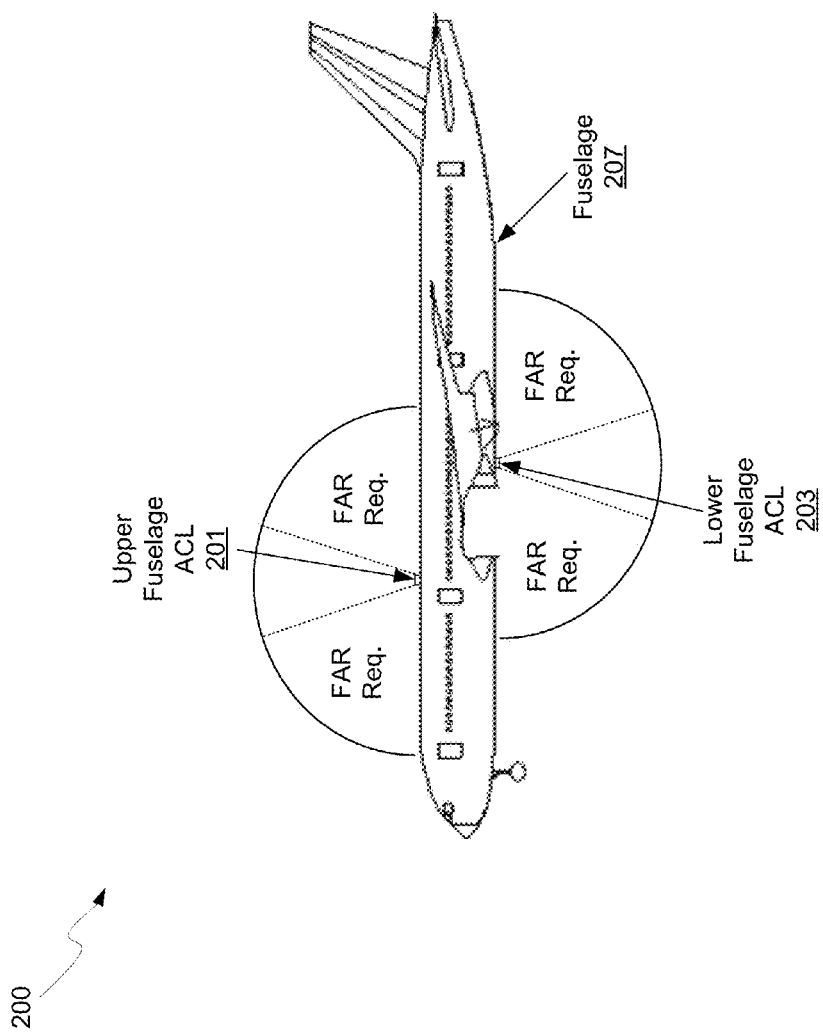
FIG. 2A is a diagram illustrating fuselage anti-collision lighting on an aircraft, in accordance with an embodiment of the invention.

FIG. 2A is a diagram illustrating fuselage anti-collision lighting on an aircraft, in accordance with an embodiment of the invention. Referring to FIG. 2A, there is shown an aircraft 200 comprising an upper fuselage anti-collision light 201, a lower fuselage anti-collision light 203, and a fuselage 207.

The upper fuselage anti-collision light 201 and the lower fuselage anti-collision light 203 may blink red and serve to warn other aircraft of the presence of the aircraft 200. The field of coverage of the lights must extend from horizontal to +75 degrees in all directions (360 degrees around the aircraft) to comply with FAR 25.1401. The lights must blink not less than 40 times and not more than 100 times per minute to meet FAR 25.1401.

To meet these requirements, conventional anti-collision lights comprise xenon flash tube or LED assemblies with lenses that extend up to a several inches out of the fuselage. This volume extending outside of the fuselage may add tens of pounds of weight equivalent drag. Furthermore, maintenance of these lights requires personnel to replace bulbs above or below the aircraft, which may require lifts.

In an exemplary embodiment of the invention, the upper fuselage anti-collision light 201 and the lower fuselage anti-collision light 203 may comprise a DOE assembly located at the top and bottom surfaces of the fuselage 207. The DOE assemblies may receive coherent light from an optical source via one or more optical waveguides, which may comprise one or more fibers, or fiber bundles, for example. Due to the configurable output capability of diffractive optics, anti-collision lights may be placed at the upper and lower surface of the fuselage 207 without a drag-inducing lens assembly. In addition, the coherent light source may be placed at nearly any location within the fuselage 207, including at locations that allow for easy maintenance and replacement, due to the low loss in optical fiber transmission.

Figure 2B:
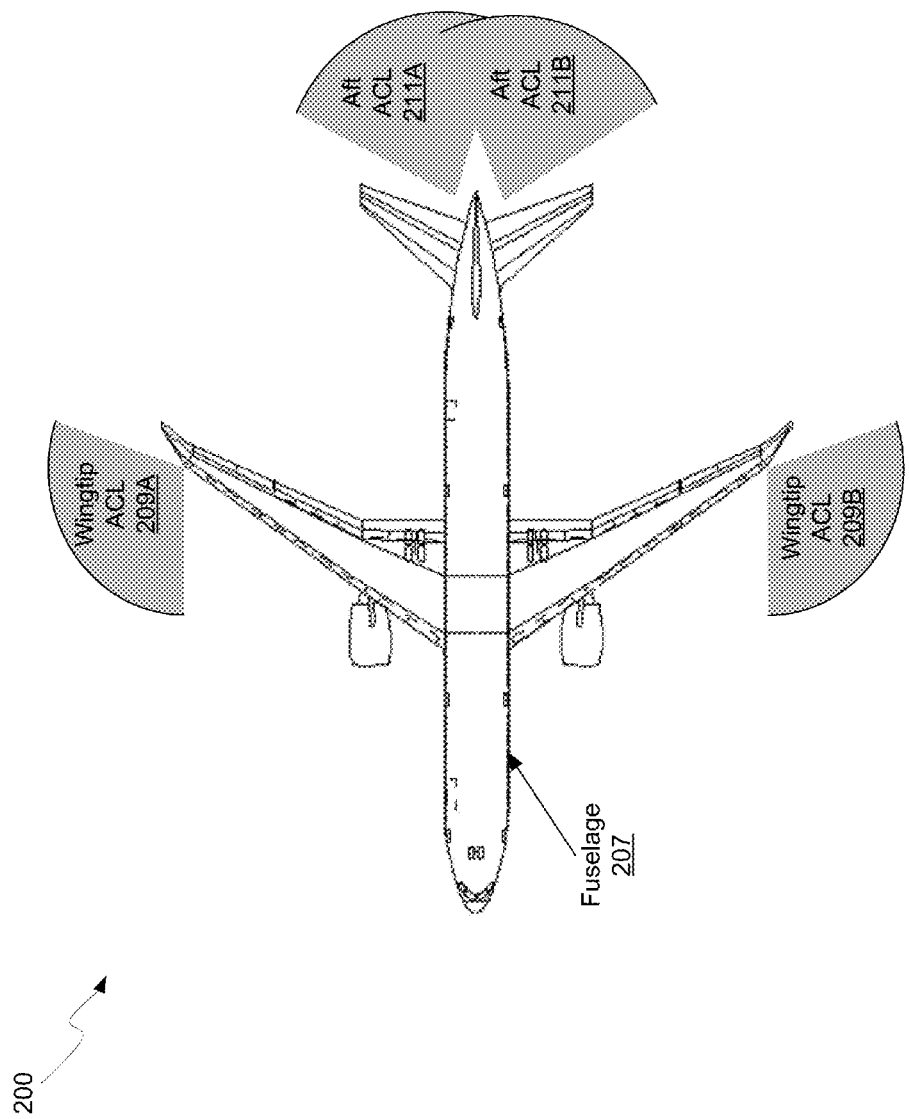
FIG. 2B is a diagram illustrating anti-collision lighting on an aircraft, in accordance with an embodiment of the invention.

FIG. 2B is a diagram illustrating anti-collision lighting on an aircraft, in accordance with an embodiment of the invention. Referring to FIG. 2B, there is shown the aircraft 200 comprising the fuselage 207, wingtip anti-collision lights 209A and 209B, and tail cone anti-collision lights 211A and 211B.

The tail cone anti-collision lights 211A and 211B comprise blinking white lights integrated into the tail cone of the aircraft 200 to alert pilots of other aircraft of the presence of the aircraft 200. To comply with FAR requirements, the aft anti-collision lights 105A and 105B cover the angular range of +75 degrees to −75 degrees vertically and 140 degrees, +/−70 degrees, in the horizontal plane.

The wingtip anti-collision lights 209A and 209B comprise white lights in the wingtips, which may be integrated in the same housing as the forward position lights 101A and 101B, for example. The FAR requirements specify that wingtip anti-collision lights cover the angular range from −75 degrees to +75 degrees vertically and from 0 degrees (straight ahead) to +140 degrees and −140 degrees aft, respectively, for the right and left wingtip anti-collision wingtip lights.

In an exemplary embodiment of the invention, diffractive optical elements (DOEs) may be utilized for the wingtip anti-collision lights 209A and 209B and tail cone anti-collision lights 211A and 211B, with the DOEs receiving optical signals from one or more coherent sources located remotely in the aircraft 200. The emitted optical pattern from a DOE may be configurable such that it may be designed to comply with the appropriate FAR. Coherent optical signals may be communicated to DOE assemblies in the wingtip anti-collision lights 209A and 209B and aft anti-collision lights 211A and 211B utilizing one or more optical fibers or fiber bundles. In instances where the lights are to be white, three coherent sources, such as red, green, and blue sources may be utilized with a diffuser and/or lens element, for example.

Figure 3:
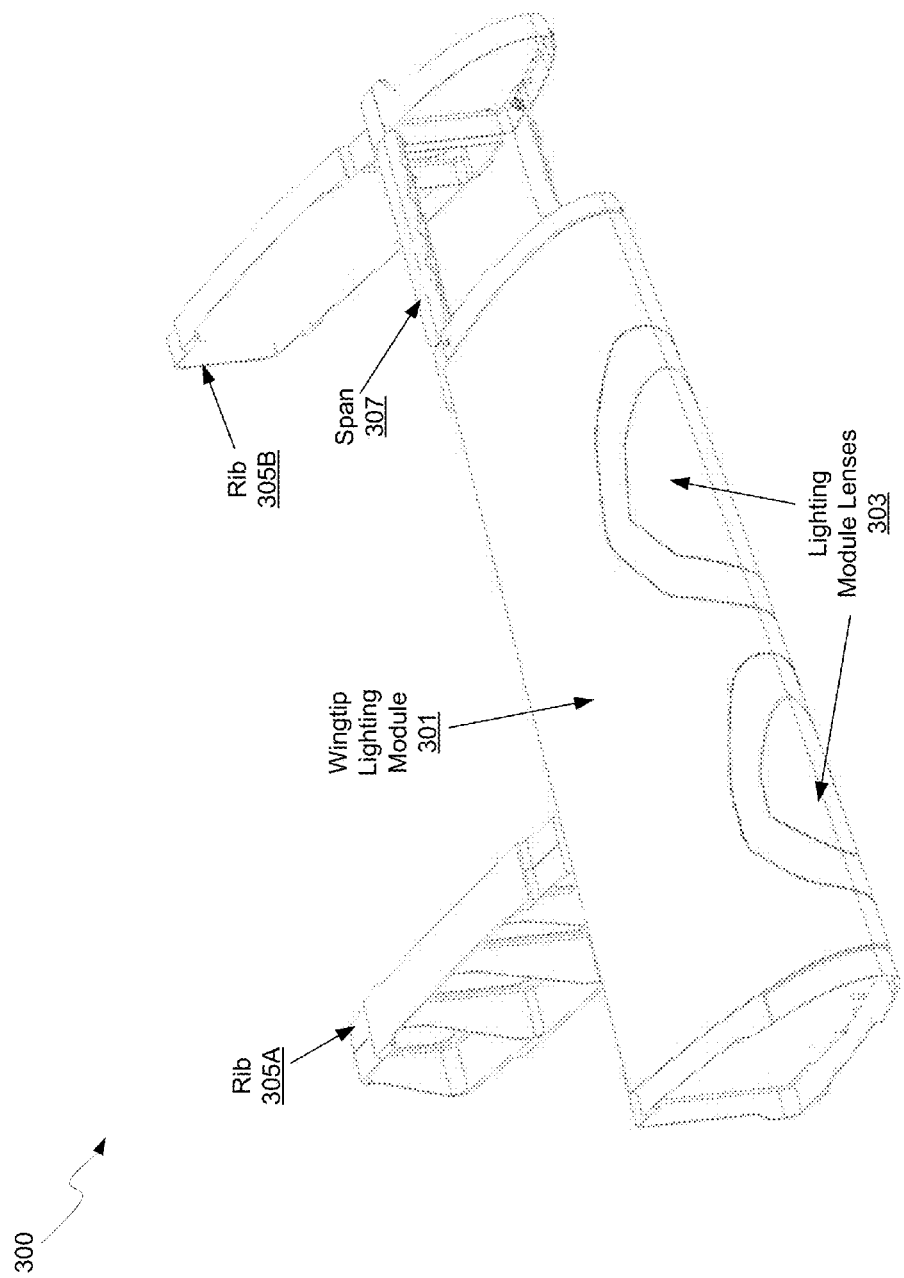
FIG. 3 is a diagram illustrating a wingtip lighting module, in accordance with an embodiment of the invention.

FIG. 3 is a diagram illustrating a wingtip lighting module, in accordance with an embodiment of the invention. Referring to FIG. 3, there is shown an integrated wingtip assembly 300 comprising a wingtip lighting module 301, lighting module lenses 303, ribs 305A and 305B, and a span 307.

The ribs 305A and 305B and the span 307 may provide structural support for the wingtip assembly 300. The wingtip lighting module 301 may comprise lighting assemblies for anti-collision and indicator lights, for example. Accordingly, the lighting module lenses 303 may comprise glass lenses for configuring the output beam pattern of the lighting assemblies in the wingtip lighting module 301.

Conventional lighting may require significant volume in the wingtip, to house power circuitry, lenses, bulbs, and bulb housings, for example. This may hinder wing design as wing dimensions decrease. Position and anti-collision light systems are typically designed specifically for a given aircraft's geometry and flight performance properties. To use an existing lighting system on a new airplane program at best requires a significant design change if not an entire redesign of the light housing and optics to insure that it remains compliant to the FAR requirements. Such redesigns are costly, and involve significant duplication of work.

In an exemplary embodiment of the invention, a coherent light source with diffractive optical elements may be utilized to generate light in compliance with FAR requirements. For example, a coherent light source, such as a solid-state laser, may be located remotely in the aircraft so as to not use valuable space in the wingtip, and may communicate coherent light via one or more optical fibers or fiber bundles to diffractive optical elements at the leading edge of the wingtip assembly 300. DOE assemblies may be on the order of a millimeter in size, or less, and thus may drastically reduce the surface area of the wing leading edge dedicated to lighting. Thus, the lighting module lenses 303 may be drastically reduced in size as compared to conventional light source lenses. For example, the lighting module lenses 303 may be only a few millimeters across or less when utilizing diffractive optical elements for lighting, as compared to 50-100 square inches for conventional light lenses. Furthermore, DOE assemblies may be dynamically configured, enabling the use of platform light assemblies with software-controlled light patterns.

Due to the low loss of optical fibers, the light source may be located remotely from the DOE exit point for easy maintenance access. Thus, the wingtip lighting module 301 may simply house diffractive optical elements and protective lenses at the leading edge of the wing. Optical fibers or bundles may be threaded through the ribs 305A and 305B and the span 307 to access the diffractive optical elements. Accordingly, the wingtip lighting module 301 may only need to house diffractive optical elements and associated protective lenses and allow optical fibers to pass through to the elements. This may comprise a significant reduction in volume in the wingtip as well as a significant reduction of surface area in the leading edge of the wing dedicated to lighting. By utilizing diffractive optical elements with a coherent light source, the surface area at the leading edge may be reduced from 50-100 square inches for conventional lighting to less than ⅛ inch square. In addition, this reduction in surface area also reduces weight by eliminating a few pounds of glass on the aircraft.

Furthermore, conventional indication lighting systems are sometimes difficult to perform maintenance on given their wingtip and upper fuselage locations. In addition to requiring a lift to get to these lights, they may be difficult to perform maintenance on. For example, the integrated wingtip light assembly may have dozens of fasteners. Only the most basic maintenance (replacing a light module) can be performed on the aircraft, other problems with the power supplies, or electronics could require the entire light to be removed. Because these lights are required for night dispatch, such delays would likely ground that aircraft until repairs could be completed.

In an exemplary embodiment of the invention, by placing the coherent light source at an easily accessible location on the aircraft, and diffractive optical elements in the wingtip, the ease of maintenance of wingtip lighting systems may be greatly increased. For example, the laser source may be simply swapped out from a cargo hold or even within the cabin, allowing for in-flight replacement, if necessary. In addition, due to the highly configurable nature of fiber optics with splitters and taps, multiple, redundant coherent light sources may be installed in aircraft, greatly improving up-time and reducing maintenance delays.

Figure 4:
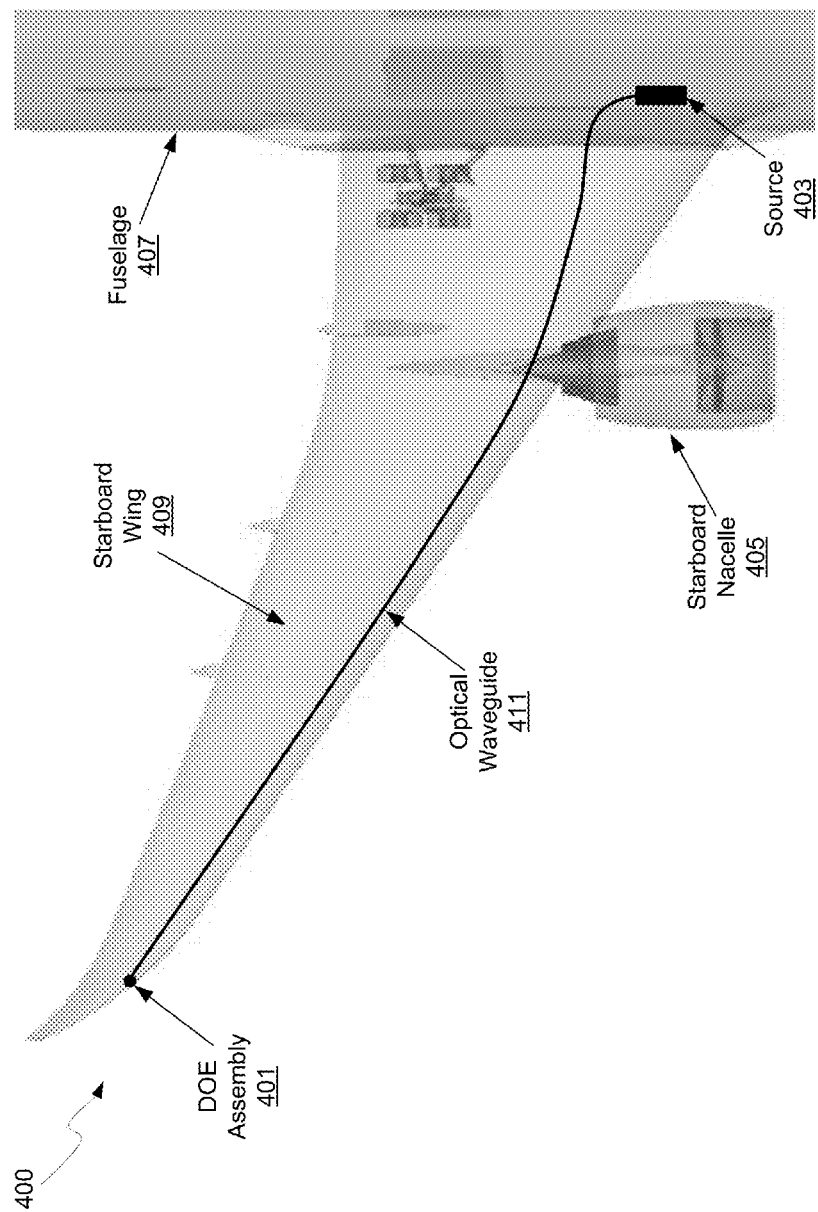
FIG. 4 is a diagram illustrating a coherent light source and diffractive optical elements for wingtip lights, in accordance with an embodiment of the invention.

FIG. 4 is a diagram illustrating a coherent light source and diffractive optical elements for wingtip lights, in accordance with an embodiment of the invention. Referring to FIG. 4, there is shown a wingtip diffractive optical element lighting system 400 comprising a DOE assembly 401, a coherent light source 403, a starboard nacelle 405, a fuselage 407, a starboard wing 409, and an optical waveguide 411.

The DOE assembly 401 may comprise one or more diffractive optical elements, a fiber-to-DOE coupler, and one or more protective lenses, for example, that may be operable to emit visible light in a pattern defined by the diffractive optical elements. The DOE assembly 401 may be significantly smaller than conventional lighting modules, which include bulbs, bulb assemblies, electronics, and lens assemblies, all of which require significant space in the wingtip as well as surface area on the leading edge of the wingtip. The DOE assembly 401 may require an orifice of less than ⅛ inch square in the starboard wing 409 to provide lighting functionality, as compared to conventional lighting that requires 50-100 square inches of surface area in the wingtip.

The coherent light source 403 may comprise a laser, such as a solid state, gas, or chemical, for example, that may be operable to communicate an optical signal with a narrow bandwidth, on the order of tens of nanometers, for example, to the DOE assembly 401 via the optical waveguide 411. Solid state laser sources are nearly as efficient as light emitting diode (LED) sources; however with the added benefit of diffractive optics, a solid state laser and diffractive optical element light can be made to comply very closely to the FAR, and would not place light in areas of the pattern where light is not required. Such a coherent-based position light would consume ~2.8 and ~0.8 Watts of electrical power for the red and green lights respectively, consuming 100 times less power then an incandescent solution, and 10 times less than an LED solution.

The optical waveguide 411 may comprise one or more optical fibers or fiber bundles, for example, that may be operable to communicate coherent light from the coherent light source 403 to the DOE assembly 401. A unique property of coherent light is that it is easily confined to optical waveguides, such as the optical waveguide 411, with low loss propagation. The property of low loss propagation in a guiding medium enables the laser source to be located a significant distance from the actual location where the light exits the aircraft skin. The coherent light source 403 could be located, for example, inside the aircraft where the thermal and environmental conditions are not as harsh, and only the optical waveguide 411 and passive DOE in the DOE assembly 401 would be located at the wingtip itself.

In another exemplary scenario, the coherent optical source 403 could be located outside the aircraft but further inboard of the wingtip. At such a location, the wing structure could be used as a heat sink for the coherent light source 403. Both of these locations help to remove equipment from the wingtip, enabling complex and thin wing shapes that would not provide sufficient room to locally house a conventional light source.

Figure 5:
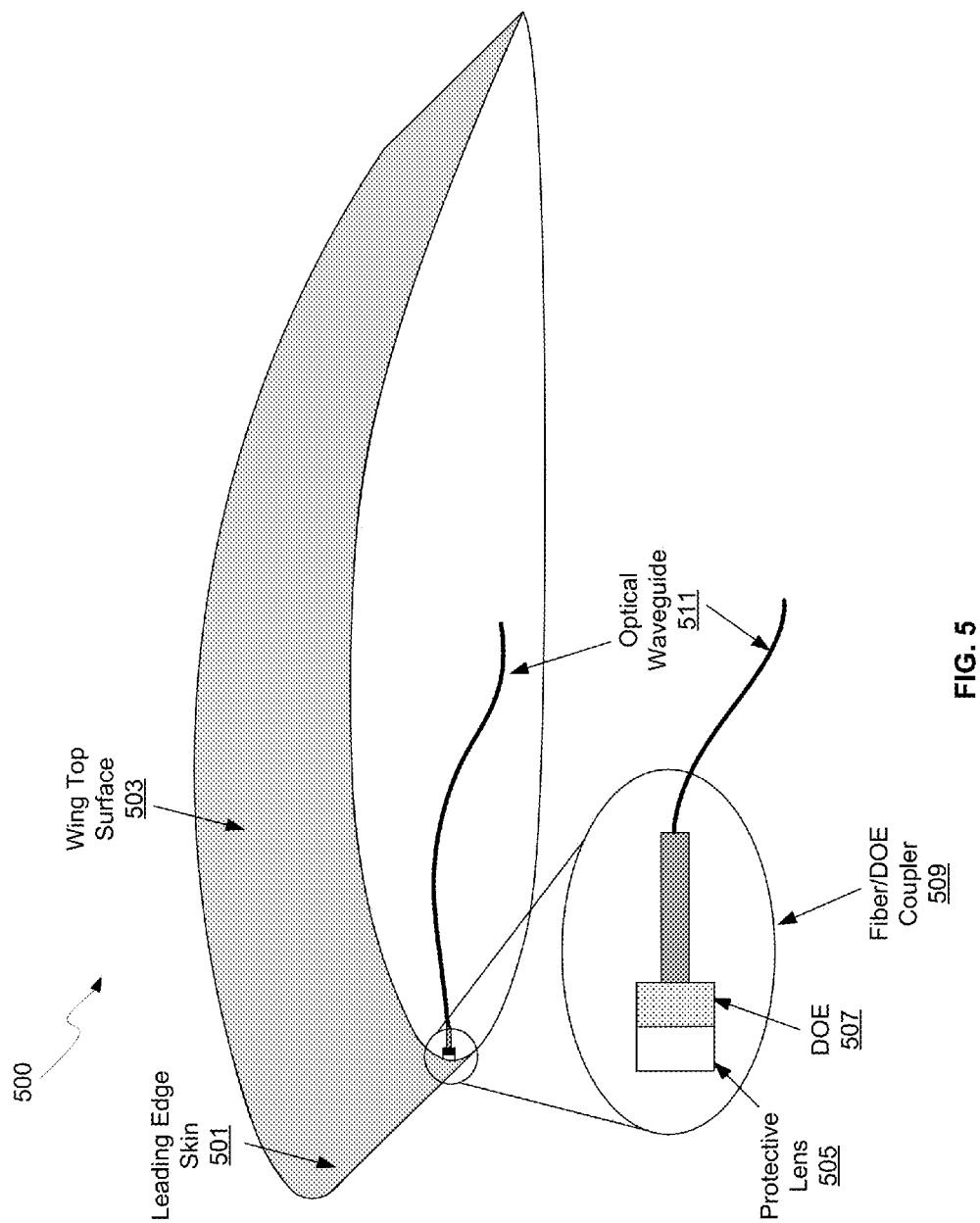
FIG. 5 is a diagram illustrating a cross-section of a wing leading edge with diffractive optical element light, in accordance with an embodiment of the invention.

FIG. 5 is a diagram illustrating a cross-section of a wing leading edge with diffractive optical element light, in accordance with an embodiment of the invention. Referring to FIG. 5, there is shown a wing leading edge 500 comprising a leading edge skin 501, a DOE protective lens 505, a DOE 507, a fiber-to-DOE coupler 509, and an optical waveguide 511.

The leading edge skin 501 may comprise the outer surface of the wing structure. Conventional lighting systems require large areas of the skin to be cut out to allow for lenses. In an exemplary embodiment of the invention, utilizing DOE assemblies may result in greatly reduced surface area on the leading edge skin 501 cut out for lighting purposes. For example, conventional lens assemblies may require ~70 square inches of area on the leading edge, whereas the DOE 507 and the protective lens 505 may be only a few millimeters or less across. This reduction in surface area utilizing a DOE assembly may also improve the structural soundness of the wing.

The wing leading edge 500 may comprise structural supports for the wing that may be utilized in the routing of the optical waveguide 511. Utilizing a DOE assembly for lighting as opposed to conventional lighting assemblies may enable more flexibility in the placement of the leading edge ribs in the wing structure.

The protective lens 505 may comprise glass or other material for protecting the DOE assembly 507 from the exterior elements. The protective lens 505 may comprise an area of less than ⅛ inch as compared to conventional lighting assembly lenses of up to 50-100 square inches.

The DOE assembly 507 may comprise an optical element of varying dielectric thicknesses, and thus varying phase delay, which results in the diffraction of coherent light that passes through the assembly. By configuring the thickness at each point in the DOE assembly 507, a desired output optical pattern may be obtained.

The optical waveguide 511 may comprise one or more optical fibers or fiber bundles, for example, that may be operable to communicate coherent light from a coherent light source to the DOE 507.

FIG. 5 illustrates the advantages of coherent light with diffractive optical elements over conventional lighting. The volume in the wing used for lighting purposes is greatly decreased compared to conventional lighting assemblies, which require electronics for the active devices, bulbs and assemblies, and large-area complex curvature lenses.

Furthermore, by utilizing diffractive optical elements and remote light sources, the wing may house only passive devices, such as the DOE assembly 507, the fiber-to-DOE assembly coupler 509 and the optical waveguide 511, while active devices, such as the coherent light source, may be housed elsewhere where space is not so constrained and access for maintenance is improved.

A unique advantage of diffractive optics is that all the light in the pattern is effectively controlled as the entire coherent laser beam passes through the DOE. Diffractive optical element design techniques, such as the Gerchberg-Saxton (GS) Error-Reduction Algorithm, allow for very specific intensity patterns to be created. Thus, the geometry of the light, location, and unique aircraft surfaces may be considered when specifically designing the DOE to avoid placing light in regions where potential scattering surfaces exist, such as the engine nacelle, aircraft body, or flight deck window. Such highly optimized intensity distributions have not previously been achieved due to the limitations of conventional optics.

A properly designed DOE is capable of providing extremely sharp cutoffs of less than one degree, far exceeding what is required by FAR 25.1389 (20 degrees). A position light implemented with a DOE also complies with the FAR overlap requirement.

Figure 6:
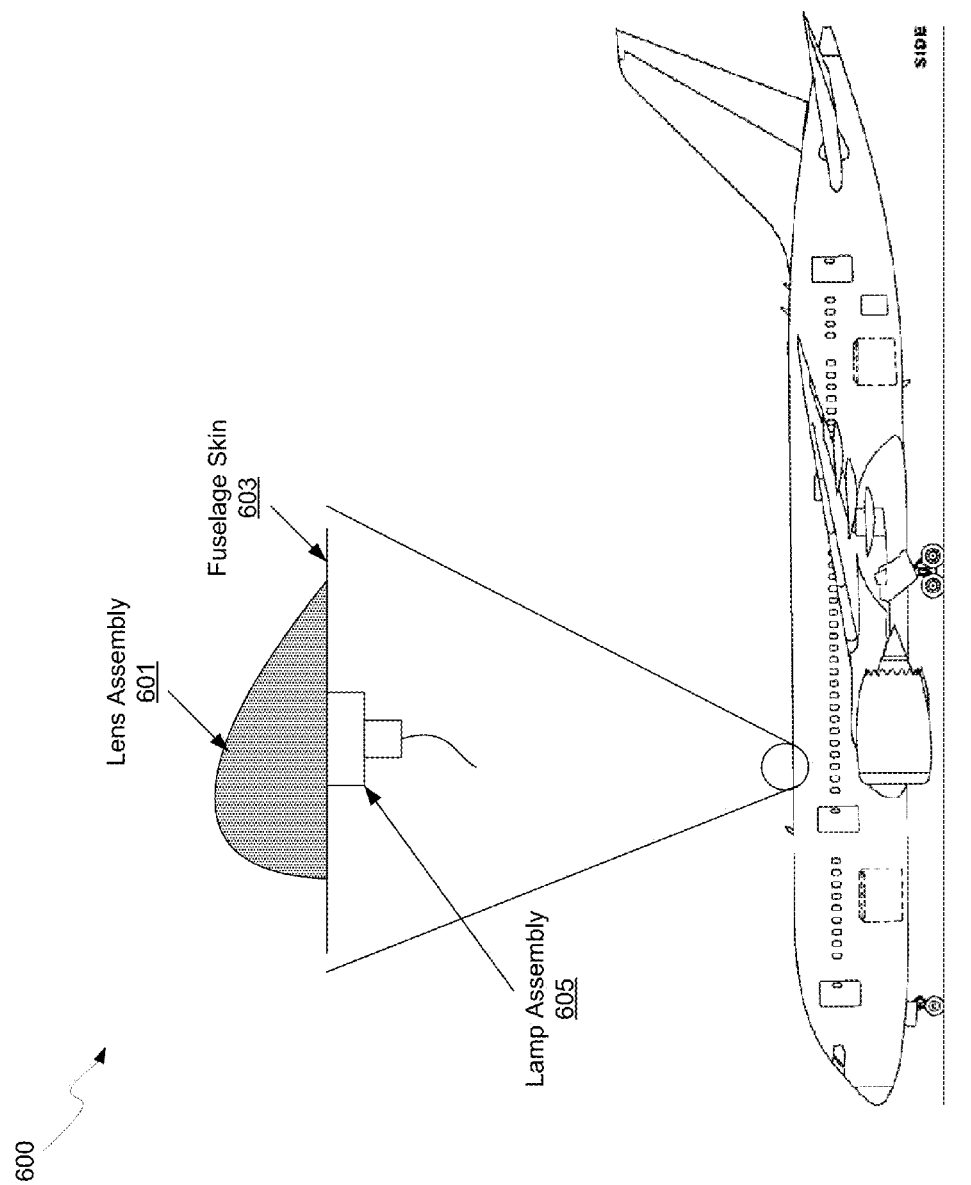
FIG. 6 is a diagram illustrating a conventional fuselage anti-collision light, in connection with an embodiment of the invention.

FIG. 6 is a diagram illustrating a conventional fuselage anti-collision light, in connection with an embodiment of the invention. Referring to FIG. 6, there is shown a fuselage anti-collision light 600 comprising a lens assembly 601, fuselage skin 603, and a lamp assembly 605.

Conventional fuselage anti-collision lights are located on the upper and lower fuselage, and between them are intended to provide coverage over the entire sphere, with exception of blockage by the vertical stabilizer directly aft. Like the wingtip light, for a conventional light, it is necessary for the source, which is typically a xenon flash tube or LED array, to be co-located with the optics. In order to meet this design constraint, conventional fuselage anti-collision lights must protrude from the fuselage several inches. Such an obstruction in the airstream introduces drag.

Figure 7:
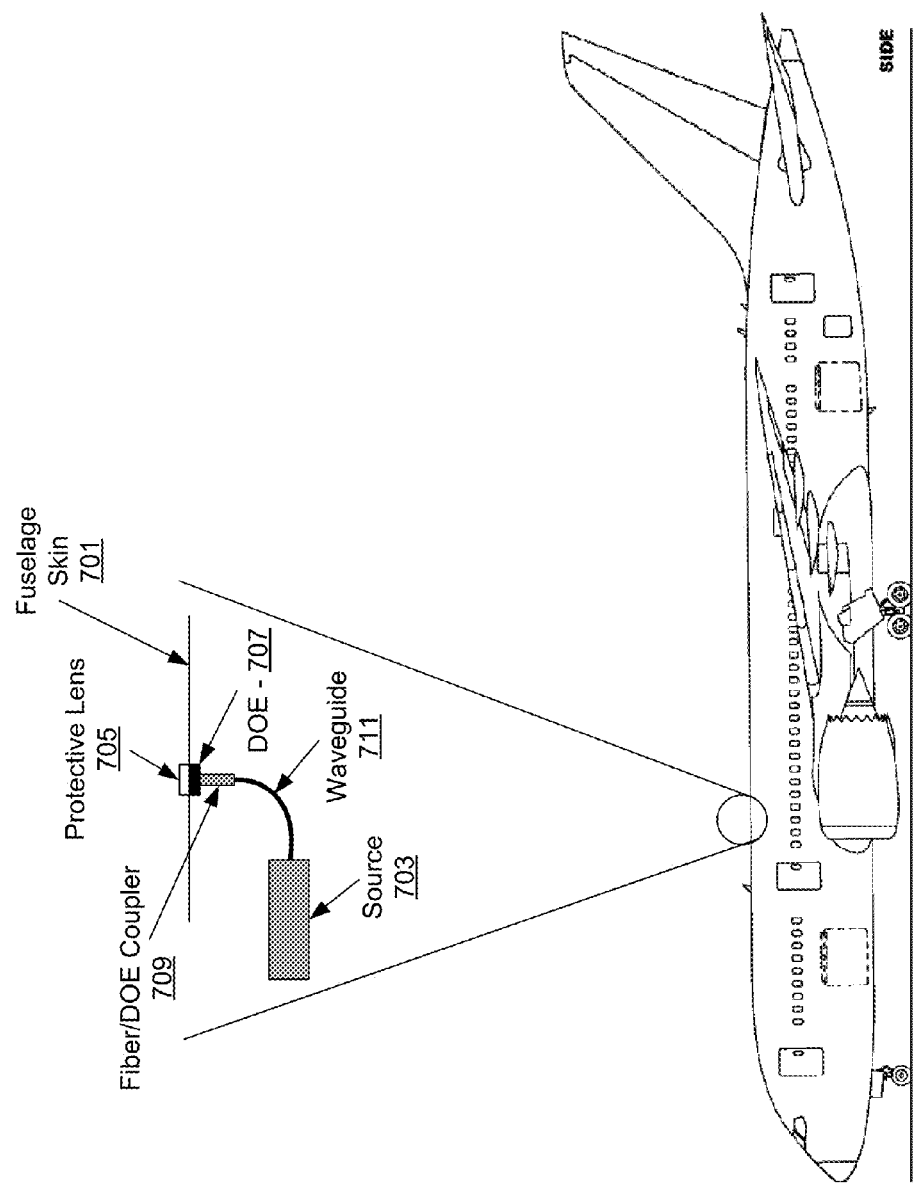
FIG. 7 is a diagram that illustrates a fuselage anti-collision light with diffractive optical element, in accordance with an embodiment of the invention.

FIG. 7 is a diagram that illustrates a fuselage anti-collision light with diffractive optical element, in accordance with an embodiment of the invention. Referring to FIG. 7, there is shown a diffractive optical element fuselage anti-collision light 700 comprising a coherent optical source 703, an optical fiber 711, a diffractive optical element 707, a protective lens 705, and a fiber-to-DOE coupler 709. There is also shown a fuselage skin 701.

As with the wingtip position light, a coherent-based diffractive optical element may be utilized for fuselage anti-collision lights driven by one or more remote coherent sources. In this manner, it is possible to integrate an anti-collision light that adds nearly zero additional drag to the aircraft. Such a design could have a small dimple optic only a few millimeters across or less on the surface of the fuselage that provides the same optical coverage as a conventional fuselage anti-collision light over a foot in length.

Diffractive optics introduce the ability to separate the source and optics spatially and functionally. For example the coherent optical source 703 and fiber-to-DOE coupler 709 could be designed into one module, and the DOE 707 and protective lens 705 would be a separate module. Alternatively, the protective lens 705, the DOE 707, and the fiber-to-DOE coupler 709 may comprise a single module. The fiber-to-DOE coupler 709 may comprise lensing elements for focusing the optical beam from the optical waveguide 711 onto the diffractive elements of the DOE 707.

The coherent optical source 707 may generate red coherent light, and the DOE 707 would be designed specifically for the source type and target aircraft geometry. The benefit of such an architecture would be that the laser source module 703 for a given light could be used on any aircraft, with the only design challenge being finding a place to mount it. While the coherent light source 703 is shown relatively close to the DOE 707, it may be located at any position in the aircraft depending on source output power and losses in the optical fiber coupling the source to the DOE 707.

For a white source, the coherent optical source 703 may comprise three sources, such as red, green, and blue (RGB) coherent sources that may each communicate coherent light to a separate DOE with the resulting light combined by a diffuser and/or lens. This may allow for sharing of sources, as red and green position/anti-collision lights may utilize the red and green sources utilized in an RGB source. In another exemplary scenario, a single DOE may be utilized to receive each source color for a white light. Similarly, all red lights may share a single red source and all green lights may share a green source.

As the optic module may be designed with a standard form factor, i.e., a fixed diameter fiber coupled to a fixed dimension DOE, it may be easily shared between aircraft, as well as between applications. For example, with coherent-based DOE lighting, both a wingtip light on one type of aircraft and a fuselage anti-collision light on another aircraft would have a common-sized small module installed penetrating the skin an equal amount, likely less than ⅛ inch in diameter. In the optic module, only the DOE, on the order of 500 µm by 500 µm in size, for example, would be different.

With the ability to separate optical and source functionality that DOE technology provides, there are several options for architectures that significantly improve maintainability of the lighting system. For example, the source module may be located where maintenance can be easily performed, such as at ground level or a convenient interior location. Because almost all of the complexity in such an architecture is contained within the source, where the optics are entirely passive, maintenance would be greatly simplified over conventional lighting systems. The source module could be swapped out in minutes, and could even be replaced during flight if necessary. More elaborate systems could be utilized that automatically detect optical source failure and engage a back up source that couples light into the same optical fiber. In this manner, it would be possible to have a series of light modules that extend the overall life and reliability of the system.

Figure 8:
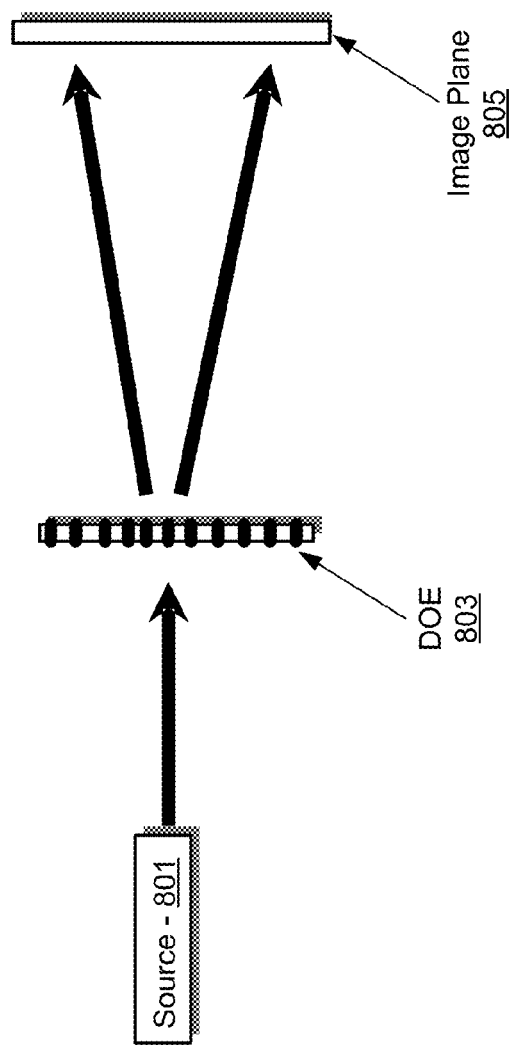
FIG. 8 is a diagram that illustrates diffractive optics, in accordance with an embodiment of the invention.

FIG. 8 is a diagram that illustrates diffractive optics, in accordance with an embodiment of the invention. Referring to FIG. 8, there is shown a coherent light source 801, a diffractive optical element (DOE) 803, and an image plane 805. The DOE 803 may comprise a dielectric material, such as glass, that may be processed utilizing typical semiconductor processes to define a varying thickness profile across the area of the DOE 803 for producing a varying phase delay for optical signals passing through the structure.

Diffraction has been defined as "any deviation of light rays from rectilinear paths which cannot be interpreted as reflection or refraction." It may be considered a wave phenomena encountered when light propagation is disturbed. These wave properties of light can be leveraged to create various novel optical functions in coherent light systems that are difficult or impossible to achieve in any other way.

By systematically delaying the wave of a coherent light source at various spatial locations, the resulting reflected or transmitted wave front may interfere with itself in such a way that a very specific optical intensity distribution is achieved. The element used to achieve these phase delays in a propagating wave is referred to as a diffractive optical element. With the use of micro-fabrication processes such as lithography and etching, a static DOE may be fabricated that has varying thickness, and thus varying phase delays, along its surface.

Several iterative algorithms may be utilized to compute the necessary phase delay at each location on the surface of the DOE 803 to yield the desired interference pattern in the output field, at the image plane 805. If the source illumination from the source 801 is spatially coherent and quasi-monochromatic with wavelength, a Fourier-transform relationship exists between the DOE phase and image plane intensity.

One DOE design algorithm that makes use of this Fourier relationship is called the Gerchberg-Saxton (GS) Error-Reduction Algorithm. This exemplary algorithm is used here to illustrate the design of a diffractive-based red wingtip position light, while other algorithms may be utilized. The exemplary DOE 803 receives a single 10 µm diameter laser beam of Gaussian profile and divergence of $0.1e^{-4}$ rad and produces an interference pattern. The illustrated design methodology herein would be valid for the design of a green position light or red fuselage anti-collision light as well. Note the light source shall be sufficiently coherent for diffractive optics to function, which may be on the order of tens of nanometers.

Figure 9:
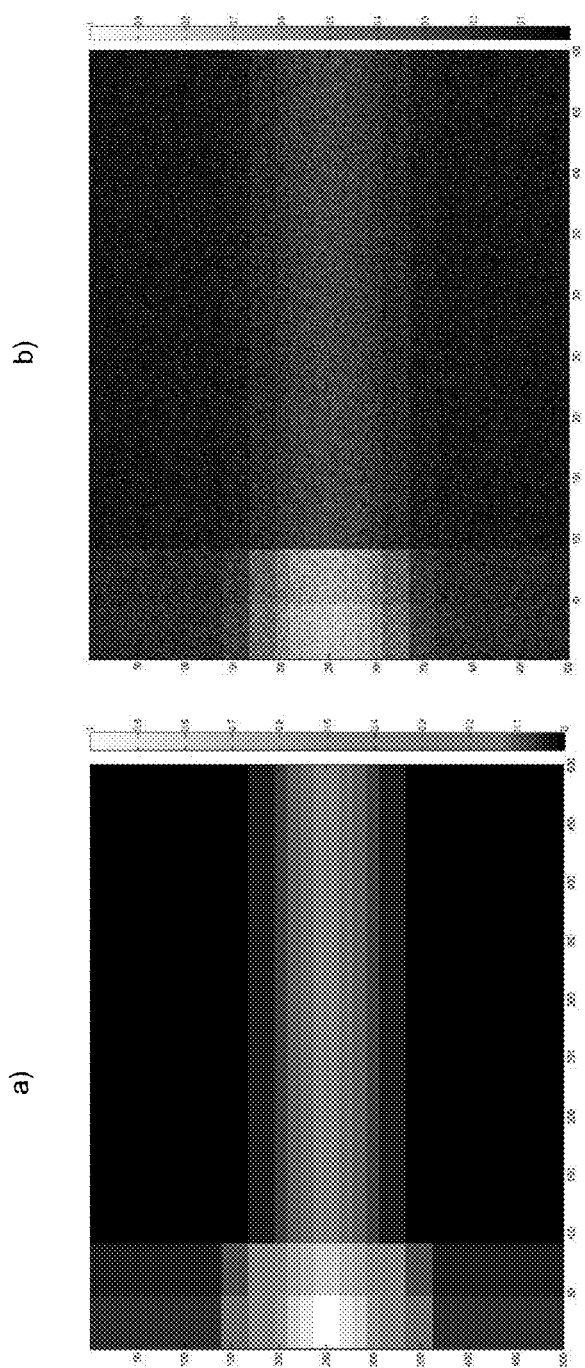
FIGS. 9 a) and b) illustrate the light intensity requirement for a position light and predicted optical patterns from a coherent-based diffractive optical element, in accordance with an embodiment of the invention.

In order to determine the necessary source power requirement, the intensity distribution of the FAR intensity requirement, illustrated in FIG. 9, is integrated over the entire hemisphere, yielding a value of ~13 lumens. In addition, a typical position light in a commercial aircraft may provide redundant modules, each providing twice the FAR intensity requirement, for a total of 52 lumens. This number may again be doubled to 104 lumens to account for losses in the optical system, including the DOE, cover lens, and possibly optical fiber. A worse-case binary phase grating type DOE typically provides about 50% efficiency over all interference orders.

The corresponding electrical requirements for such a laser source may be determined by dividing the required lumens calculated above by an overlap integral between the photopic curve and spectral density function of the source times a scale constant of 683.002 lumens/Watt. In this case, because the source is coherent at 640 nm, which is about 17% up the photopic curve, the total power is given as 104/(683.002*0.17*0.30), or 2.8 W. The 30% included in the divisor takes into account the electrical efficiency of a typical laser source. A 2.8 watt source is well within the capability of solid-state laser technology, and is considerably less then would be required by conventional lighting technology, where an incandescent system requires ~300 W and LED systems require ~19.6 W.

In this design example, the laser source 801 is located at 1 mm from the DOE 803, which is 500 µm square with a 1 µm element size. In order to take into account manufacturing limitations, the thickness of any given DOE element may be discretized into one of eight possible values. The corresponding phase delay any given pixel imparts on the incident wave front is proportional to the product of the materials refractive index and its thickness. The fabrication of such a DOE would thus utilize at least one lithography step for each of the eight material thicknesses. A DOE may also be fabricated by other techniques such as the exposure of photosensitive polymers to holographic interference patterns (volume phase holography (VPH) diffraction gratings), electron beam lithography, or Gray scale photolithographic techniques, to name a few. The technique used, DOE size, number of phase levels, laser coherency needed, substrate material, number and location of DOE elements are all design parameters which would be tuned to achieve an optimal design.

The required spatial distribution will be met at a surface 10 mm from the DOE 803 for demonstration only. An aircraft-specific implementation would likely consist of multiple DOE's in series and/or different orientations to optimize angular distribution, pattern uniformity, and to minimize losses.

The process of designing the DOE utilizing the GS error-reduction algorithm comprises six steps. In the first step, a random phase distribution is generated, which is used to seed the algorithm giving it the optimum chance of settling to the global minima. The random phase may be applied to the amplitude distribution of the input laser beam generated by the source 801 at the DOE 803, and is represented by Equation 1 below where ø is the random phase and $w_1$ is the beam region.

$$f_1[m,n] = w_1[m,n] * e^{(i e \phi[m,n])} \quad \text{Eq. 1}$$

The next step, given by Equation 2 below, is to propagate the beam with random phase through the DOE 803 to the image plane 807 using a propagation kernel F.

$$f_2[m,n] = H[m,n] * F[m,n] \quad \text{Eq. 2}$$

Here the kernel F is the 2D discrete Fourier transform, and H is the transfer function given by Equation 3. The distance to the screen is given as z, and the propagation vector k is $2*\pi/\lambda$.

$$H[m,n] e^{ikz*\sqrt{1-\lambda^2\left(\left(\frac{m}{\lambda z}\right)^2 + \left(\frac{n}{\lambda z}\right)^2\right)}} \quad \text{Eq. 3}$$

After the beam has been propagated to the image plane, the phase must be extracted from $f_2$ and applied to a new wave $f_3$ with the electric field defined by the square root of the desired output intensity, in this case the position light coverage desired.

$$f_3[m,n] = \sqrt{I[m,n]} * e^{i*\tan^{-1}\left(\frac{im(f_2(m,n))}{re(f_3(m,n))}\right)} \quad \text{Eq. 4}$$

Next the resulting intensity pattern is propagated back to the DOE 803 with the use of an inverse propagation kernel $F^{-1}$, which in this case is an inverse 2D Fourier transform, as shown in Equation 5.

$$f_2[m,n] = F^{-1}[f_3[m,n]] \quad \text{Eq. 5}$$

The final step is to extract the phase from $f_2$ as shown below in Equation 6, and apply it to $f_1$.

$$\phi[m,n] = \frac{im(f_2(m,n))}{re(f_2(m,n))} \quad \text{Eq. 6}$$

These steps are repeated until convergence of $f_2$ is obtained. The final phase obtained from Equation 6 after convergence represents the desired DOE. At the Completion of 15 iterations of this algorithm for this example, the phase distribution for the optimized DOE is found and may be converted to material thickness through Equation 7 if the index (n) is known.

$$D[m,n] = \frac{\phi[m,n]}{2*(n-1)*\pi} \quad \text{Eq 7}$$

Figure 10:
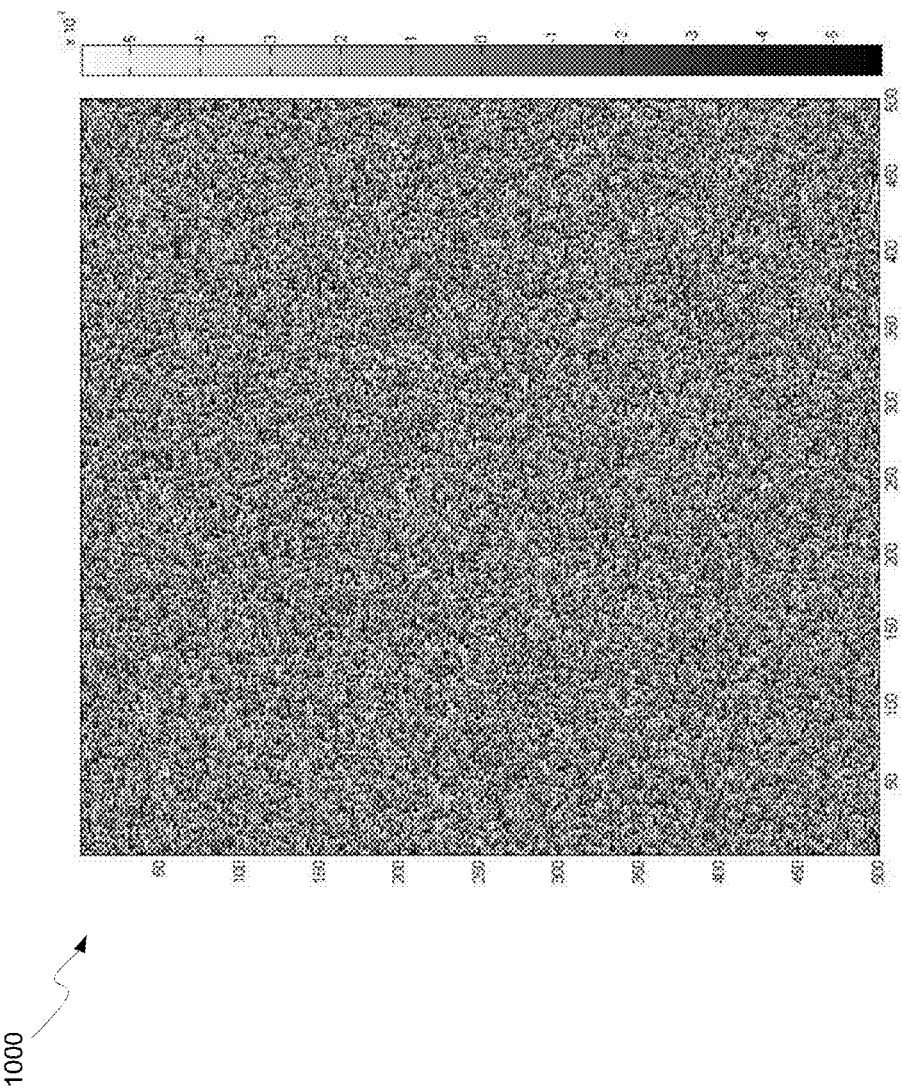
FIG. 10 is a diagram that illustrates the thickness variation across a 500×500 μm diffractive optical element, in accordance with an embodiment of the invention.

The resulting distribution on the image plane 805 10 mm in front of the DOE 803 is illustrated in FIG. 9 *b*), along with the FAR requirements shown in FIG. 9 *a*). The result of Equation 7, the thickness of the DOE 803 across the 500 ×500 μm area, is illustrated in FIG. 10.

While the GS Error-Reduction Algorithm has been illustrated here, other optimization algorithms exist for designing diffractive optical elements. Simulated annealing comprises a probabilistic optimization method where the solution is randomly perturbed. By introducing fluctuations into the solution at each iteration, the probability of converging on a local minimum is reduced. The Genetic algorithm is another, more advanced, method which spawns multiple solutions and evaluates the quality with a fitness function. At each iteration, the solution may be modified based on the most optimal solution previously found. In this way a solution can evolve to best comply with the fitness function.

FIGS. 9 *a*) and *b*) illustrate the light intensity requirement for a position light and predicted optical patterns from a coherent-based diffractive optical element, in accordance with an embodiment of the invention. Referring to FIG. 9 *a*), there is shown the required light intensity pattern for an aircraft red position light, according to FAR 25.1391. The light intensity must drop off sharply from straight ahead in both the horizontal and vertical planes, which is difficult to accomplish with conventional lights. FIG. 9 *b*) illustrates that the normalized output optical signal at the image plane 805 from the exemplary DOE 803 can be made to closely match the FAR requirement.

Diffractive optical elements may achieve divergence angles of ~110 degrees, where there is a design trade off between size of DOE features, wavelength, light coherence, DOE size, and spot size, for example. Furthermore, there are many alternatives to meeting wider angle requirements, such as a 180 degree pattern requirement. One option is to utilize one or more beam splitters that split the laser beam equally. Subsequent optics may orient the beams correctly onto one or more separate DOEs, or different angle entry angle into a single DOE, with each DOE covering a portion of the hemisphere.

Another option is to utilize a diverging lens in front of the DOE. The lens may introduce distortion into the pattern, but the DOE could be designed to compensate for the distortion in the pattern produced.

FIG. 10 is a diagram that illustrates the thickness variation across a 500×500 μm diffractive optical element, in accordance with an embodiment of the invention. Referring to FIG. 10, the thickness plot 1000 is a result of the calculations described above and represents the thickness at 250,000 points across the 500×500 μm DOE 803. The DOE 803 may comprise a glass material and thickness variations may be fabricated using etching and/or deposition techniques, for example.

In another exemplary embodiment, the DOE 803 may comprise a dynamically controllable liquid crystal. In such an implementation, the index of refraction and thus phase delay across each pixel could be individually controlled by changing the electric filed it is exposed to, similar to a liquid crystal display. This technique enables dynamic control of the diffractive optical elements and thus intensity pattern they produces. If such an element is used, the same fundamental optic module could be used for any indication or anti-collision light application. The specific state of the DOE required for a given application could be controlled in software, greatly increasing the flexibility of the luminaire.

For example, it would be possible to use the same hardware between a red anti-collision light and green position light. The optical distribution of such a light from the dynamically configurable DOE could be controlled via software. Even the light blinking rate and synchronization for the anti-collision light function could be controlled by controlling the duty cycle, for example, of the coherent light sources coupled to the respective DOEs. No longer would the identity of the light be defined by its physical design, the aircraft computer system would know which module is plugged in at a given location and would send the appropriate data signal such that the DOE performs the intended functionality of the instillation. Such a dynamic DOE would have particular application where both covert and overt modes are required for many position and anti-collision light systems. Such a dynamic DOE would not only be able to reconfigure itself to produce the correct intensity pattern depending on wavelength, but also change its pattern to avoid reflections off aircraft structure.

It should be noted that while aircraft lighting is illustrated in the exemplary embodiments described, the application is not limited to aircraft. Accordingly, the coherent-based diffractive optical element lighting described may be utilized anywhere a precise control of indicator lights or warning lights is desired. For example, automobile indicator lights could utilize the lighting technology described. Tail lights or turning signals, for example, could utilize coherent light sources coupled to diffractive optical elements placed at desired lighting positions, greatly reducing space requirements at these positions on the vehicle.

While the invention has been described with reference to certain embodiments, it will be understood by those skilled in the art that various changes may be made and equivalents may be substituted without departing from the spirit and scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for aircraft lighting, the method comprising: generating a single optical source signal from a single coherent light source; splitting the single optical source signal into multiple optical source signals; communicating each of said multiple optical source signals to a different one of a plurality of diffractive optical elements via respective optical waveguides, each of the diffractive optical elements being located at a different location about an aircraft remote from the single coherent light source; generating an output optical signal from each of the diffractive optical elements for transmission out of the respective diffractive optical elements; and dynamically controlling an intensity pattern of the output optical signal generated from each of the plurality of diffractive optical elements to switch between a first intensity pattern corresponding with a first aircraft light requirement and a second intensity pattern corresponding with a second aircraft light requirement different than the first aircraft light requirement, wherein said plurality of diffractive optical elements each comprises a dynamically-controllable liquid crystal comprising a plurality of liquid crystal pixels each individually-controllable to change an index of refraction of the optical source signal and to change an intensity pattern of the output optical signal transmitted out of the diffractive optical element by changing an electric field applied to the liquid crystal pixel.

2. The method according to claim 1, wherein the single coherent light source is located on an exterior of the aircraft.

3. The method according to claim 2, wherein the single coherent light source is located on a wing structure of the aircraft, and wherein the wing structure acts as a heat sink for the single coherent light source.

4. The method according to claim 1, wherein each of the diffractive optical elements is configured to cause different phase delays of optical signals passing through different regions of the diffractive optical element.

5. The method according to claim 4, wherein a Fourier-transform relationship exists between the phase delays of the optical signals passing through each of the plurality of diffractive optical elements and the intensity pattern of the output optical signal generated from each of the plurality of diffractive optical elements.

6. The method according to claim 1, wherein the first aircraft light requirement is a first anti-collision light requirement and the second aircraft light requirement is a second anti-collision light requirement.

7. The method according to claim 1, wherein said one or more coherent light source comprises a laser.

8. The method according to claim 1, wherein one or more of said plurality of diffractive optical elements is integrated in at least one of a fuselage and one or more wingtips of said aircraft.

9. The method according to claim 1, wherein one or more of said plurality of diffractive optical elements is integrated in at least one of a fuselage and one or more wings of said aircraft.

10. The method according to claim 1, wherein said one or more coherent light sources is located within at least one of a fuselage and one or more wings of said aircraft.

11. The method according to claim 1, wherein the first aircraft light requirement is one of a first anti-collision light requirement or first indicator light requirement, and the second aircraft light requirement is one of a second anti-collision light requirement or second indicator light requirement.

12. The method according to claim 1, wherein each of the plurality of diffractive optical elements is between about 0.25 mm$^2$ and about 1 mm$^2$.

13. The method according to claim 1, wherein each of the plurality of diffractive optical elements comprises a layer of dielectric material having a varying thickness.

14. A system for aircraft lighting, the system comprising:
a single coherent light source that generates a single optical source signal;
a plurality of optical waveguides each communicating a portion of said single optical source signal;
a plurality of diffractive optical elements each sharing the single optical source signal via one of the plurality of optical waveguides and generating an output optical signal for transmission out of the diffractive optical element, wherein each diffractive optical element comprises a dynamically-controllable liquid crystal comprising a plurality of liquid crystal pixels each individually-controllable to change an index of refraction of the optical source signal and to change an intensity pattern of the output optical signal transmitted out of the diffractive optical element by changing an electric field applied to the liquid crystal pixel; and
an aircraft computer system that controls the plurality of liquid crystal pixels of the dynamically-controllable liquid crystal of each diffractive optical element to switch between transmitting an output optical signal out of the diffractive optical element with a first intensity pattern and transmitting an output optical signal out of the diffractive optical element with a second intensity pattern, the first intensity pattern corresponding with a first aircraft light requirement and the second intensity pattern corresponding with a second aircraft light requirement different than the first aircraft light requirement.

15. The system according to claim 14, wherein the first aircraft light requirement is a first anti-collision light requirement and the second aircraft light requirement is a second anti-collision light requirement.

16. The system according to claim 14, wherein said coherent light source comprises a laser.

17. The system according to claim 14, wherein one or more of said plurality of diffractive optical elements is integrated in at least one of a fuselage and one or more wingtips of said aircraft.

18. The system according to claim 14, wherein said coherent light source is located within at least one of a fuselage and one or more wings of said aircraft.

19. A method for aircraft lighting, the method comprising: generating a single optical source signal from a single coherent light source, the single optical source signal comprising coherent light; splitting the single optical source signal into multiple optical source signals, each of the multiple optical source signals comprising coherent light; communicating each of said multiple optical source signals to a different one of a plurality of diffractive optical elements via respective optical waveguides, each of the diffractive optical elements being located at a different location about an aircraft remote from the single coherent light source; generating an output optical signal from each of the diffractive optical elements for transmission out of the respective diffractive optical elements, the diffractive optical elements being configured to scatter the coherent light of the optical source signals such that the output optical signal comprises non-coherent light having a diffractive pattern; and dynamically controlling an intensity of the diffractive pattern of the output optical signal generated from each of the plurality of diffractive optical elements to switch between a first intensity diffractive pattern corresponding with a first aircraft light requirement and a second intensity diffractive pattern corresponding with a second aircraft light requirement different than the first aircraft light requirement, wherein said plurality of diffractive optical elements each comprises a dynamically-controllable liquid crystal comprising a plurality of liquid crystal pixels each individually-controllable to change an index of refraction of the optical source signal and to change an intensity pattern of the output optical signal transmitted out of the diffractive optical element by changing an electric field applied to the liquid crystal pixel.

* * * * *